(12) United States Patent
Kobayashi

(10) Patent No.: US 12,726,042 B2
(45) Date of Patent: Sep. 1, 2026

(54) POWER SUPPLY DEVICE, CONTROL METHOD, AND STORAGE MEDIUM

(71) Applicant: HONDA MOTOR CO., LTD., Tokyo (JP)

(72) Inventor: Kazuya Kobayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 18/885,755

(22) Filed: Sep. 16, 2024

(65) Prior Publication Data

US 2025/0096592 A1 Mar. 20, 2025

(30) Foreign Application Priority Data

Sep. 20, 2023 (JP) ................................ 2023-152164

(51) Int. Cl.
*H02J 9/06* (2006.01)
*H02J 105/33* (2026.01)

(52) U.S. Cl.
CPC ............. *H02J 9/06* (2013.01); *H02J 2105/33* (2026.01)

(58) Field of Classification Search
CPC ............................... H02J 9/06; H02J 2310/46
USPC .................................................. 307/64, 10.1
See application file for complete search history.

(56) References Cited

U.S. PATENT DOCUMENTS

2020/0335966 A1 10/2020 Sato et al.
2020/0339048 A1 * 10/2020 Ferré ......................... H02J 1/10
2021/0249896 A1 * 8/2021 Panfil ...................... H02J 9/061

FOREIGN PATENT DOCUMENTS

JP 2020-178474 A 10/2020
JP 7099376 B2 7/2022

* cited by examiner

*Primary Examiner* — Michael R. Fin
(74) *Attorney, Agent, or Firm* — Paratus Law Group, PLLC

(57) ABSTRACT

A power supply device includes: a first and second main power supply lines connecting a main power supply to an electrical equipment; a first auxiliary power supply line connecting an auxiliary power supply to the first main power supply line; a second auxiliary power supply line connecting the auxiliary power supply to the second main power supply line; a first, second, third and fourth switching elements respectively provided on the first and main power supply lines and the first and second auxiliary power supply lines; and a failure detection unit configured to detect a failure of the first switching element by comparing an output value on an upstream side with that on a downstream side of the first switching element with the first and third switching elements opened and the second and fourth switching elements closed.

2 Claims, 11 Drawing Sheets

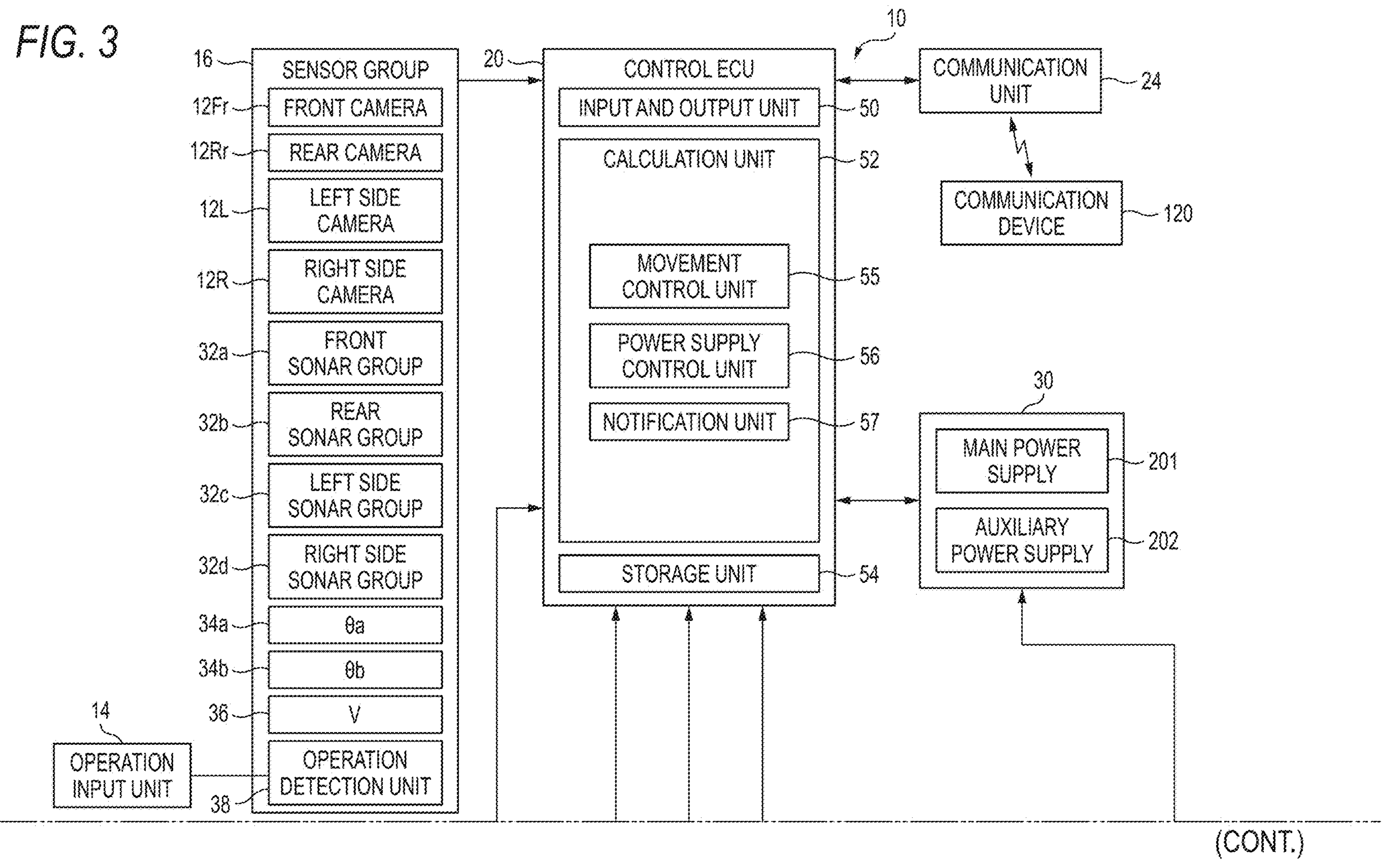
FIG. 3
16
SENSOR GROUP
12Fr
FRONT CAMERA
12Rr
REAR CAMERA
12L
LEFT SIDE CAMERA
12R
RIGHT SIDE CAMERA
32a
FRONT SONAR GROUP
32b
REAR SONAR GROUP
32c
LEFT SIDE SONAR GROUP
32d
RIGHT SIDE SONAR GROUP
34a
θa
34b
θb
36
V
38
OPERATION DETECTION UNIT
14
OPERATION INPUT UNIT
20
10
CONTROL ECU
INPUT AND OUTPUT UNIT
50
CALCULATION UNIT
52
MOVEMENT CONTROL UNIT
55
POWER SUPPLY CONTROL UNIT
56
NOTIFICATION UNIT
57
STORAGE UNIT
54
COMMUNICATION UNIT
24
COMMUNICATION DEVICE
120
30
MAIN POWER SUPPLY
201
AUXILIARY POWER SUPPLY
202
(CONT.)

(FIG. 3 CONTINUED)

200
POWER SUPPLY DEVICE
MAIN POWER SUPPLY
201
h1
L4
DC-DC
203
h2
h5
h31
h32
h4
L1
L5
L31
L32
L2a
L2b
s31
s32
s1
s2
s41
s42
L41
L42
I31
I32
I1
I2
I41
I42
POWER SUPPLY CONTROL UNIT
56
AUXILIARY POWER SUPPLY
202
SECOND BRAKING UNIT
70
FIRST BRAKING UNIT
60

200
POWER SUPPLY DEVICE
MAIN POWER SUPPLY
201
h1
DC-DC
203
L4
h2
h5
h31
h32
h4
L1
L5
L31
L32
L2a
L2b
s31 (CLOSED)
s32 (CLOSED)
s1 (CLOSED)
s2 (OPEN)
s41 (OPEN)
s42 (OPEN)
I31
I32
I1
I2
I41
I42
L41
L42
POWER SUPPLY CONTROL UNIT
56
AUXILIARY POWER SUPPLY
202
SECOND BRAKING UNIT
70
FIRST BRAKING UNIT
60

200
POWER SUPPLY DEVICE
56
POWER SUPPLY CONTROL UNIT
MAIN POWER SUPPLY
201
h1
h2
L1
h5
I31
L5
L31
I32
s31 (CLOSED)
h31
s32 (CLOSED)
h32
L32
I1
h4
L4
203
DC - DC
s1 (OPEN)
L2a
AUXILIARY POWER SUPPLY
202
L2b
s2 (OPEN)
I2
I41
I42
L41
L42
(OPEN) s41
s42 (OPEN)
G
D
S
70
SECOND BRAKING UNIT
60
FIRST BRAKING UNIT

200
POWER SUPPLY DEVICE
MAIN POWER SUPPLY
201
h1
L4
DC - DC
203
h2
h5
h31
h32
h4
L1
L5
L31
L32
l31
l32
l1
s31(OPEN)
s32 (OPEN)
s1 (OPEN)
L2a
AUXILIARY POWER SUPPLY
202
L2b
s2 (CLOSED)
56
POWER SUPPLY CONTROL UNIT
l2
l41
l42
L41
L42
s41 (CLOSED)
s42 (CLOSED)
70
SECOND BRAKING UNIT
60
FIRST BRAKING UNIT

200
POWER SUPPLY DEVICE
56
POWER SUPPLY CONTROL UNIT
MAIN POWER SUPPLY
201
h1
h2
L1
h5
I31
L5
I41
I2
70
SECOND BRAKING UNIT
L31
s31 (OPEN)
I32
I42
h31
p1
D
S
p2
G
s32 (CLOSED)
h32
L32
L4
I1
60
(OPEN)
s41
h4
L41
FIRST BRAKING UNIT
AUXILIARY POWER SUPPLY
203
DC-DC
s1 (OPEN)
L2a
202
L2b
s2 (OPEN)
L42
Di41
s42 (CLOSED)

200
POWER SUPPLY DEVICE
MAIN POWER SUPPLY
201
h1
DC-DC
203
L4
h2
h5
h31
h32
h4
L1
L5
L31
L32
L2a
L2b
I31
I32
I1
I2
I41
I42
s31 (CLOSED)
s32 (OPEN)
s1 (OPEN)
s2 (OPEN)
s41 (CLOSED)
s42 (OPEN)
Di42
L41
L42
p3
p4
G
D
S
POWER SUPPLY CONTROL UNIT
56
AUXILIARY POWER SUPPLY
202
SECOND BRAKING UNIT
70
FIRST BRAKING UNIT
60

POWER SUPPLY DEVICE, CONTROL METHOD, AND STORAGE MEDIUM

This application is based upon and claims the benefit of priority from prior Japanese patent application No. 2023-152164, filed on Sep. 20, 2023, the entire contents of which are incorporated herein by reference.

TECHNICAL FIELD

The present disclosure relates to a power supply device, a control method, and a storage medium.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to driving assistance techniques.

In the related art, there is known a remote parking system that remotely operates a vehicle to park the vehicle in a specified predetermined parking space or to cause the vehicle to exit from the parking space. There is known a vehicle including a main power supply (secondary battery) that supplies electric power to vehicle electrical components during normal vehicle traveling or during vehicle parking control, and an auxiliary power supply (capacitor) that supplies electric power to a safety device that decelerates or stops the vehicle when a failure occurs in the main power supply. When the main power supply and the auxiliary power supply are provided, for example, a switching element is used to switch between supply of electric power from the main power supply and supply of electric power from the auxiliary power supply. Therefore, in order to correctly switch the supply of electric power, it is important that the switching element operates without failure.

JP7099376B discloses a vehicle electronic control device that determines whether there is stuck-on in a power supply switch by determining whether a voltage difference between upstream and downstream of the power supply switch varies according to a change in a charging function by a charging unit in a control state in which the power supply switch is controlled from on to off.

JP2020-178474A discloses a power supply circuit in which, for example, in a case where a seventh metal oxide semiconductor field-effect transistor (MOSFET) to a tenth MOSFET are in a powered state, it is determined that an open circuit fault occurs in the seventh MOSFET when an intermediate potential Vm5 is 0 V whereas an intermediate potential Vm6 is the same potential as a power supply voltage of a main power supply, and in a case where a first MOSFET to a sixth MOSFET are in a cut-off state, it is determined that a short circuit fault occurs in the first MOSFET when an intermediate potential Vm1 is the same potential as an output voltage of an auxiliary power supply.

SUMMARY

According to JP7099376B and JP2020-178474A, it is possible to detect a failure of the switching element. It is desired that the failure of the switching element can be detected earlier and easier after the failure occurs. Therefore, there is room for further improvement in the related art with regard to the method of detecting the failure of the switching element.

Aspects of the present disclosure relates to providing a power supply device, a control method, and a storage medium storing a control program that can determine a failure of a switching element while continuing supply of electric power to each piece of electrical equipment. This contributes to development of a sustainable transportation system.

According to an aspect of the present disclosure, there is provided a power supply device including:

- a main power supply configured to supply electric power to electrical equipment;
- an auxiliary power supply different from the main power supply, the auxiliary power supply being configured to supply electric power to the electrical equipment;
- a first main power supply line configured to connect the main power supply to the electrical equipment;
- a second main power supply line different from the first main power supply line, the second main power supply line being configured to connect the main power supply to the electrical equipment;
- a first auxiliary power supply line configured to connect the auxiliary power supply to the first main power supply line;
- a second auxiliary power supply line configured to connect the auxiliary power supply to the second main power supply line;
- a first switching element provided on the first main power supply line, the first switching element being configured to switch a state of power supply from the main power supply to the electrical equipment;
- a second switching element provided on the second main power supply line, the second switching element being configured to switch the state of power supply from the main power supply to the electrical equipment;
- a third switching element provided on the first auxiliary power supply line, the third switching element being configured to switch a state of power supply from the auxiliary power supply to the electrical equipment;
- a fourth switching element provided on the second auxiliary power supply line, the fourth switching element being configured to switch the state of power supply from the auxiliary power supply to the electrical equipment; and
- a failure detection unit configured to detect a failure of the first switching element or the second switching element, in which
- the failure detection unit detects the failure of the first switching element by comparing an output value on an upstream side with an output value on a downstream side of the first switching element in a state in which the first switching element and the third switching element are opened whereas the second switching element and the fourth switching element are closed.

According to another aspect of the present disclosure, there is provided a control method for a power supply device, the power supply device including

- a main power supply configured to supply electric power to electrical equipment,
- an auxiliary power supply different from the main power supply, the auxiliary power supply being configured to supply electric power to the electrical equipment,
- a first main power supply line configured to connect the main power supply to the electrical equipment, a second main power supply line different from the first main power supply line, the second main power supply line being configured to connect the main power supply to the electrical equipment, a first auxiliary power supply line configured to connect the auxiliary power supply to the first main power supply line, a second auxiliary power supply line configured to connect the auxiliary power supply to the second main power supply line, a first switching element provided on the first main power supply line, the first switching element being configured to switch a state of power supply from the main power supply to the electrical equipment, a second switching element provided on the second main power supply line, the second switching element being configured to switch the state of power supply from the main power supply to the electrical equipment, a third switching element provided on the first auxiliary power supply line, the third switching element being configured to switch a state of power supply from the auxiliary power supply to the electrical equipment, and a fourth switching element provided on the second auxiliary power supply line, the fourth switching element being configured to switch the state of power supply from the auxiliary power supply to the electrical equipment, the control method including:

causing a processor of the power supply device to detect a failure of the first switching element by comparing an output value on an upstream side with an output value on a downstream side of the first switching element in a state in which the first switching element and the third switching element are opened whereas the second switching element and the fourth switching element are closed.

According to another aspect of the present disclosure, there is provided a non-transitory computer readable storage medium storing a control program for a power supply device, the power supply device including a main power supply configured to supply electric power to electrical equipment, an auxiliary power supply different from the main power supply, the auxiliary power supply being configured to supply electric power to the electrical equipment, a first main power supply line configured to connect the main power supply to the electrical equipment, a second main power supply line different from the first main power supply line, the second main power supply line being configured to connect the main power supply to the electrical equipment, a first auxiliary power supply line configured to connect the auxiliary power supply to the first main power supply line, a second auxiliary power supply line configured to connect the auxiliary power supply to the second main power supply line, a first switching element provided on the first main power supply line, the first switching element being configured to switch a state of power supply from the main power supply to the electrical equipment, a second switching element provided on the second main power supply line, the second switching element being configured to switch the state of power supply from the main power supply to the electrical equipment, a third switching element provided on the first auxiliary power supply line, the third switching element being configured to switch a state of power supply from the auxiliary power supply to the electrical equipment, and a fourth switching element provided on the second auxiliary power supply line, the fourth switching element being configured to switch the state of power supply from the auxiliary power supply to the electrical equipment, the control program causing a processor of the power supply device to execute processing, the processing including:

detecting a failure of the first switching element by comparing an output value on an upstream side with an output value on a downstream side of the first switching element in a state in which the first switching element and the third switching element are opened whereas the second switching element and the fourth switching element are closed.

According to the present disclosure, it is possible to provide a power supply device, a control method, and a storage medium storing a control program that can determine a failure of a switching element while continuing supply of electric power to each piece of electrical equipment.

BRIEF DESCRIPTION OF DRAWINGS

Exemplary embodiment(s) of the present invention will be described in detail based on the following figures, wherein:

FIG. 5 shows an operation of the power supply device when ignition is on;

DESCRIPTION OF EMBODIMENTS

Figure 1:
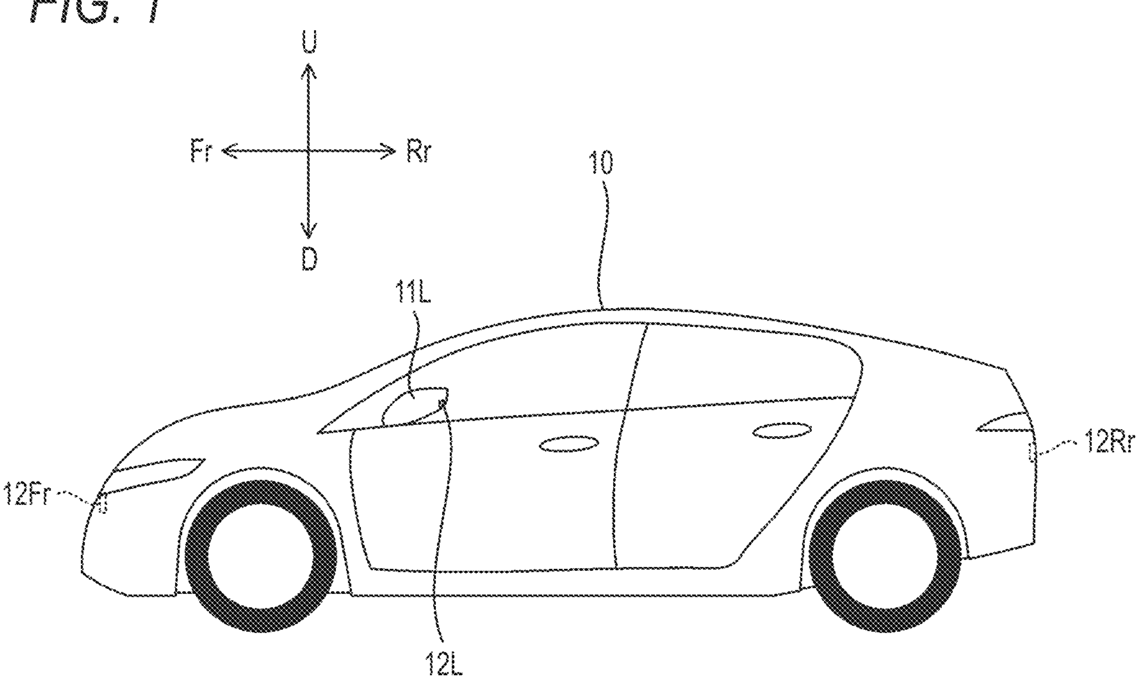
FIG. 1 is a side view showing an example of a vehicle equipped with a power supply device of the present disclosure.

Hereinafter, an embodiment of a power supply device, a control method, and a storage medium storing a control program according to the present disclosure will be described with reference to the attached drawings. The drawings are viewed in directions of reference numerals. In order to simplify and clarify the description in the present specification or the like, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

Vehicle 10 Equipped with Power Supply Device of Present Disclosure

Figure 2:
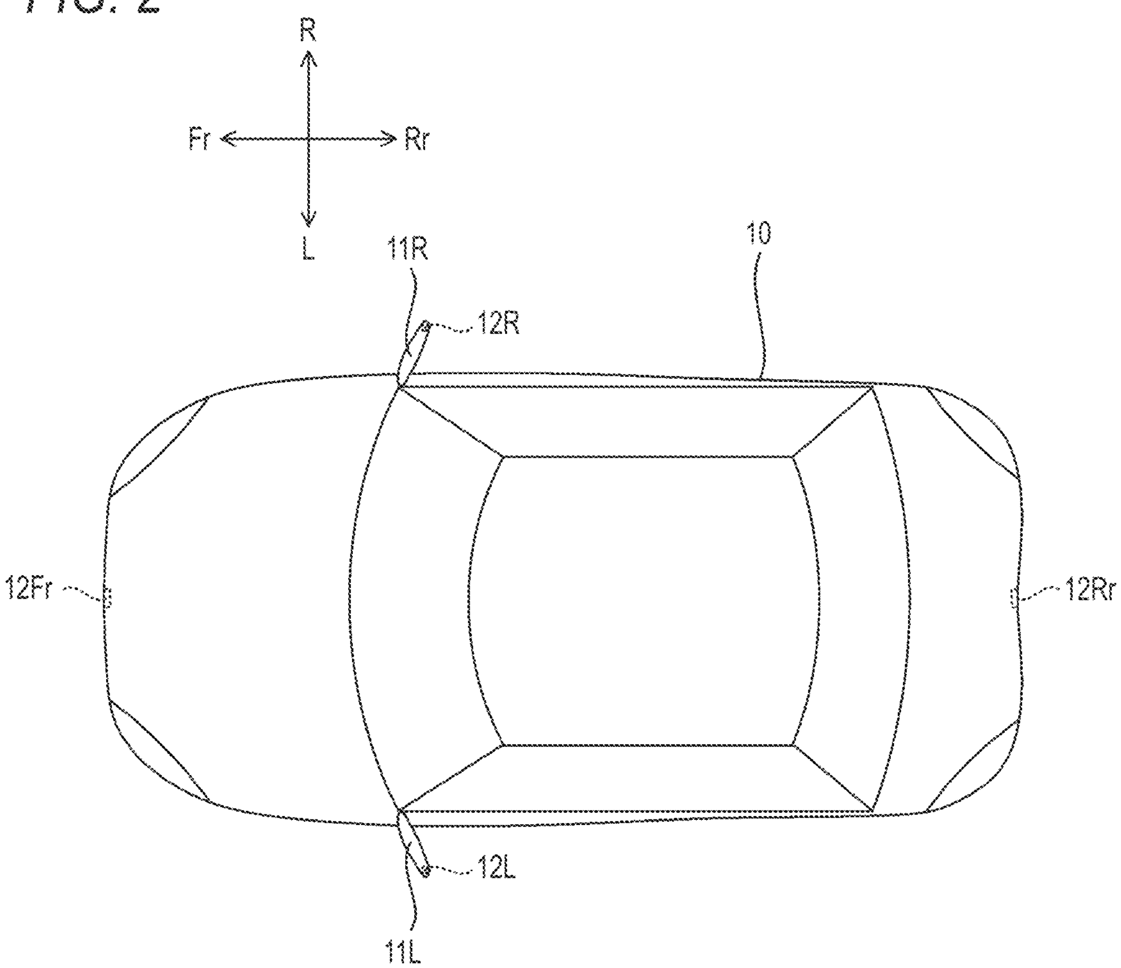
FIG. 2 is a top view of the vehicle shown in FIG. 1.

FIG. 1 is a side view showing an example of the vehicle 10 equipped with a power supply device according to the present disclosure. FIG. 2 is a top view of the vehicle 10 shown in FIG. 1. The vehicle 10 is an example of a "moving object" in the present disclosure.

The vehicle 10 is an automobile including a drive source (not shown) and wheels including drive wheels driven by power of the drive source and steerable steered wheels. In the present embodiment, the vehicle 10 is a four-wheeled automobile having a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. The drive source of the vehicle 10 may drive the pair of left and right front wheels, the pair of left and right rear wheels, or four wheels including the pair of left and right front wheels and the pair of left and right rear wheels. The front wheels and the rear wheels may all be steerable wheels, or the front wheels or the rear wheels may be steerable wheels.

The vehicle 10 further includes side mirrors 11L and 11R. The side mirrors 11L and 11R are mirrors (back mirrors) provided on outer sides of front seat doors of the vehicle 10 for the driver to check the rear side and rear lateral sides. The side mirrors 11L and 11R are fixed to a body of the vehicle 10 by rotation shafts extending in a vertical direction, and may be opened and closed by rotating about the rotation shafts.

The vehicle 10 further includes a front camera 12Fr, a rear camera 12Rr, a left side camera 12L, and a right side camera 12R. The front camera 12Fr is a digital camera that is provided on the front side of the vehicle 10 and captures an image of the front side of the vehicle 10. The rear camera 12Rr is a digital camera that is provided on the rear side of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

Internal Configuration of Vehicle 10

Figure 3:
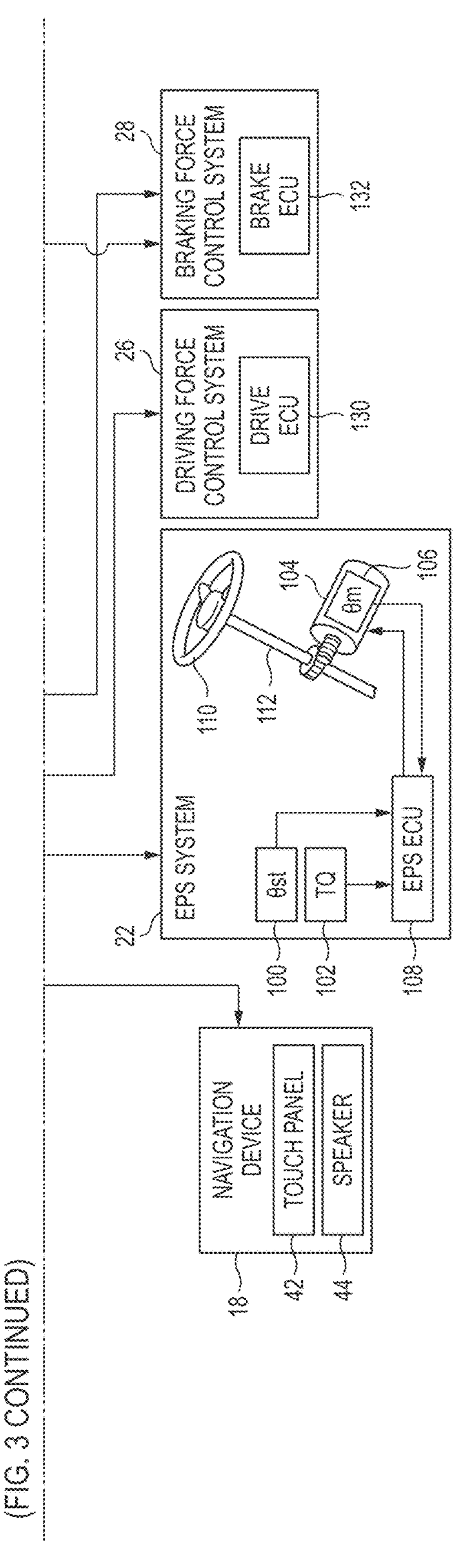
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 includes a driving force control system 26, a braking force control system 28, and a power supply 30.

The sensor group 16 acquires various detection values used for control by the control ECU 20. The sensor group 16 includes the front camera 12Fr, the rear camera 12Rr, the left side camera 12L, and the right side camera 12R. The sensor group 16 also includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38. The sensor group 16 may include radar.

The front camera 12Fr, the rear camera 12Rr, the left side camera 12L, and the right side camera 12R acquire recognition data (for example, peripheral image data) for recognizing an external environment of the vehicle 10 by capturing images of a periphery of the vehicle 10. The peripheral images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image.

The front sonar group 32*a*, the rear sonar group 32*b*, the left side sonar group 32*c*, and the right side sonar group 32*d* emit sound waves to the periphery of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are provided at a right side front portion and a right side rear portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by a predetermined angle. The detection pulses output from the wheel sensors 34*a* and 34*b* are used to calculate rotation angles and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects an operation content of a user performed using an operation input unit 14, and outputs the detected operation content to the control ECU 20. The operation input unit 14 includes various user interfaces such as a side mirror switch that switches between open and closed states of the side mirrors 11L and 11R, and a shift lever (a selector lever or a selector).

The navigation device 18 detects a current position of the vehicle 10 by using, for example, a global positioning system (GPS), and guides the user along a path to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various types of guidance information to the user of the vehicle 10 by voice.

The touch panel 42 enables input of various commands to the control ECU 20. For example, the user may input a command related to movement assistance of the vehicle 10 via the touch panel 42. The movement assistance includes parking assistance and exiting assistance of the vehicle 10. The touch panel 42 displays various screens related to control contents of the control ECU 20. For example, the touch panel 42 displays a screen related to the movement assistance of the vehicle 10. Specifically, the touch panel 42 displays a parking assistance button for requesting parking assistance of the vehicle 10 and an exiting assistance button for requesting exiting assistance. The parking assistance button includes an automated parking button for requesting parking by automatic steering of the control ECU 20, and a support parking button for requesting support while parking the vehicle by an operation of the user. The exiting assistance button includes an automated exiting button for requesting exiting by the automatic steering of the control ECU 20, and a support exiting button for requesting support while exiting by an operation of the user. Components other than the touch panel 42, for example, a smartphone or a tablet terminal may also be used as the input device or the display device.

The power supply 30 includes a main power supply 201 and an auxiliary power supply 202. The main power supply 201 is a power supply that supplies electric power to electrical equipment mounted on the vehicle 10. For example, the main power supply 201 supplies electric power to an anti-lock brake system (ABS) that operates during emergency braking, and to an electric power steering (EPS) that operates during sharp steering. The main power supply 201 supplies electric power to an auto parking system (APS) for performing automated parking of the vehicle 10. The main power supply 201 also supplies electric power to a vehicle stability assist (VSA) and an electric parking brake (EPB) that decelerate or stop the vehicle 10. The main power supply 201 is a power supply that supplies electric power to (charges) the auxiliary power supply 202 via a pass-through circuit.

The auxiliary power supply 202 is a power supply that supplies electric power to the VSA and the EPB when a failure occurs in the main power supply 201. The auxiliary power supply 202 is used to activate fail-safe function by an operation of the VSA and the EPB. The main power supply 201 is, for example, a secondary battery such as a lithium ion battery, a nickel-metal hydride battery, or a lead-acid battery. The auxiliary power supply 202 is, for example, an electric double-layer capacitor. The main power supply 201 and the auxiliary power supply 202 each have a voltage of 12 V, for example. The power supply 30 is connected to the control ECU 20.

The control ECU 20 includes an input and output unit 50, a calculation unit 52, and a storage unit 54. The calculation unit 52 is implemented by, for example, a central processing unit (CPU). The calculation unit 52 executes various types of control by controlling units based on a program stored in the storage unit 54. The calculation unit 52 receives and outputs signals from and to units connected to the control ECU 20 via the input and output unit 50. The control ECU 20 is an example of the "electrical equipment" in the present disclosure.

The calculation unit 52 includes a movement control unit 55 that performs movement control of the vehicle 10, a power supply control unit 56 that detects failures related to the main power supply 201 and the auxiliary power supply 202, and a notification unit 57 that notifies the user of information about the movement control.

The movement control unit 55 performs automated parking assistance and automated exiting assistance of the vehicle 10 through automatic steering in which a steering 110 is automatically operated under control of the movement control unit 55. In the automated parking assistance and the automated exiting assistance, an accelerator pedal (not shown), a brake pedal (not shown), and the operation input unit 14 are automatically operated. The movement control unit 55 performs support parking assistance and support exiting assistance when the user (driver) operates the accelerator pedal, the brake pedal, and the operation input unit 14 to perform manual parking and manual exiting of the vehicle 10. During the automated parking assistance and the automated exiting assistance, the user may be in the vehicle 10, or may get off the vehicle 10 and be outside.

For example, the movement control unit 55 performs the movement control for executing movement of the vehicle 10 based on the recognition data of the external environment of the vehicle 10 acquired by the front camera 12Fr, the rear camera 12Rr, the left side camera 12L, and the right side camera 12R, and a parking space specified by the user. The movement control includes parking control for causing the vehicle 10 to perform automated parking in a predetermined parking space (target parking position) and exiting control for causing the vehicle 10 to perform automated exiting from the predetermined parking space to a target movement position. The movement control unit 55 may execute the parking control and the exiting control according to an instruction signal input from outside via the input and output unit 50. The input from the outside includes input by wireless communication from an information terminal or the like portable by the user of the vehicle 10. The movement control unit 55 may transmit information about the parking control and the exiting control to the external information terminal via the input and output unit 50.

When a failure related to the main power supply 201 of the vehicle 10 is detected, the movement control unit 55 controls a braking unit of the vehicle 10 to stop the vehicle 10. The braking unit of the vehicle 10 includes, for example, the braking force control system 28 to be described later. The braking unit and the movement control unit 55 are examples of the "electrical equipment" in the present disclosure.

When the failure related to the main power supply 201 of the vehicle 10 is detected, the power supply control unit 56 controls the power supply 30 to supply electric power from the auxiliary power supply 202 to the braking unit (electrical equipment). When the failure related to the main power supply 201 of the vehicle 10 is detected, the power supply control unit 56 determines whether supply of electric power to the electrical equipment is stoppable, and performs control to stop the supply of electric power from the main power supply 201 to the electrical equipment when the supply of electric power to the electrical equipment is stoppable. The supply of electric power to the electrical equipment is stoppable, for example, when an operation system of the vehicle 10 can be safely stopped, when the vehicle 10 can be stopped at a safe place, or after the vehicle 10 is stopped. When the failure related to the main power supply 201 is detected, the power supply control unit 56 transmits a failure detection signal to the notification unit 57.

The notification unit 57 notifies the user of the vehicle 10 when the failure related to the main power supply 201 is detected and the braking unit is controlled to stop the vehicle 10. The notification unit 57 notifies the user that the vehicle 10 is to be stopped based on the failure detection signal from the power supply control unit 56. The notification includes a notification such as "the vehicle 10 will be stopped due to a failure occurring in the power supply", a notification related to a response of the user, and the like. The notification may be a notification to an external server, a notification to an administrator, or a notification to the driver of the vehicle 10.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby providing support for an occupant's operation on the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 includes a base station, a communication device of another vehicle, or an information terminal such as a smartphone or a tablet terminal portable by the user of the vehicle 10. For example, the communication unit 24 includes an ultra wide band (UWB, registered trademark) interface for performing UWB communication with the information terminal. The information terminal will be described later.

The driving force control system 26 includes a drive ECU 130. The driving force control system 26 executes driving force control of the vehicle 10. The drive ECU 130 controls a driving force of the vehicle 10 by controlling an engine (not shown) or the like based on an operation by the user on an accelerator pedal (not shown).

The braking force control system 28 includes a brake ECU 132. The braking force control system 28 executes braking force control of the vehicle 10. The brake ECU 132 controls a braking force of the vehicle 10 by controlling a brake mechanism or the like (not shown) based on an operation by the user on a brake pedal (not shown).

Configuration of Power Supply Device and Operation Thereof

Next, a configuration of a power supply device 200 according to the present disclosure and an operation thereof will be described.

[Configuration of Power Supply Device 200]

Figure 4:
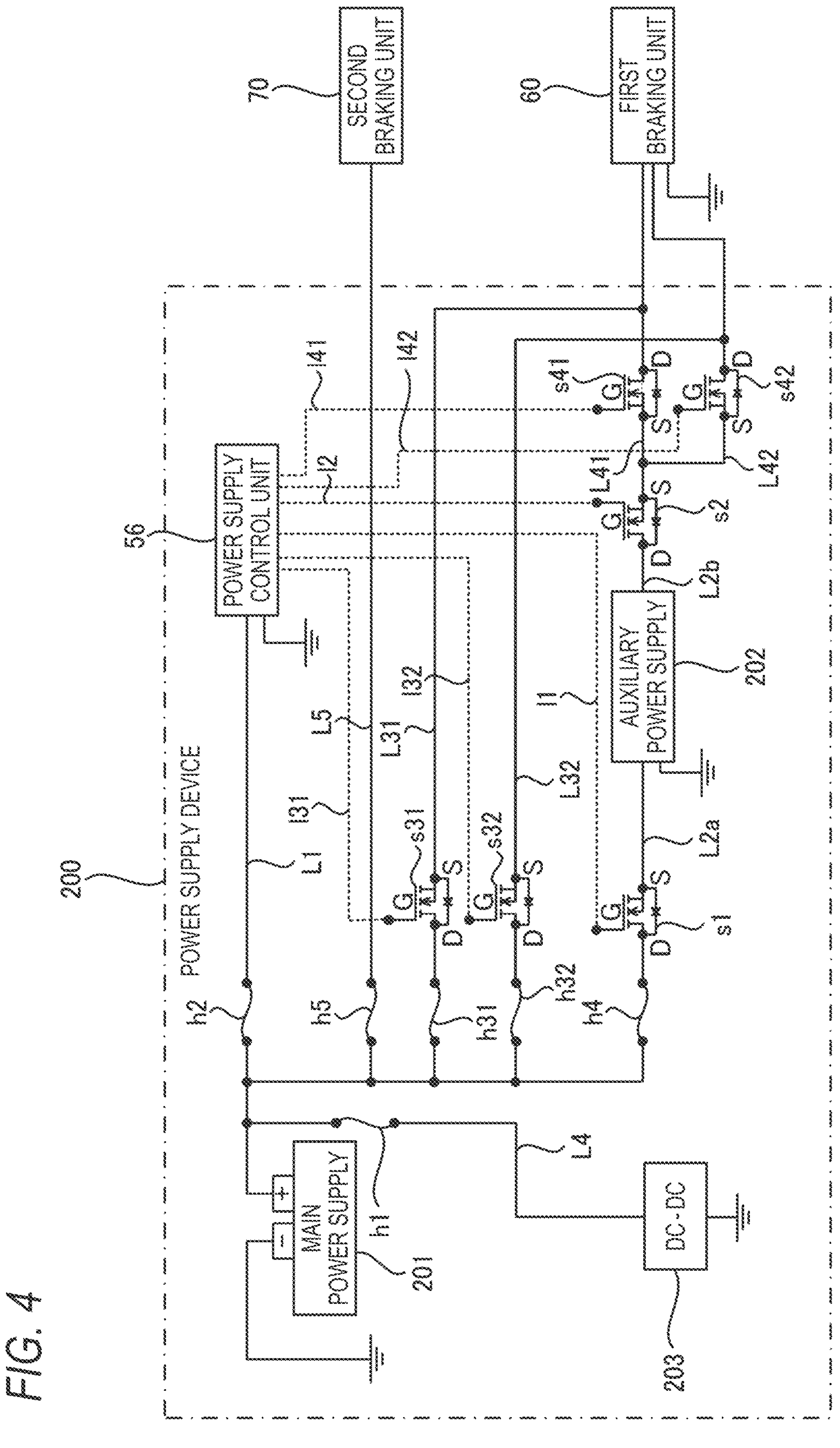
FIG. 4 shows an example of a circuit configuration of the power supply device.

FIG. 4 shows an example of a circuit configuration of the power supply device 200. As shown in FIG. 4, the power supply device 200 includes the main power supply 201, the auxiliary power supply 202, the power supply control unit 56, a first braking unit 60, a second braking unit 70, and a DC/DC converter 203. The power supply device 200 is a power supply device mounted on the vehicle 10 as described above. The power supply control unit 56 of the power supply device 200 is a power supply control unit provided in the control ECU 20. The first braking unit 60 is an example of the "electrical equipment" in the present disclosure.

In the power supply device 200, the main power supply 201 is connected to the power supply control unit 56 via a power supply line L1. The power supply line L1 is provided with a fuse h2. The main power supply 201 may supply electric power to the power supply control unit 56. The power supply control unit 56 is an example of the "electrical equipment" in the present disclosure.

The main power supply 201 is connected to the auxiliary power supply 202 via a power supply line L2*a*. The power supply line L2*a* is provided with a fuse h4 and a switching element s1 connected in series. The main power supply 201 may supply electric power to (charge) the auxiliary power supply 202.

The main power supply 201 is connected to the first braking unit 60 via a power supply line L31. The power supply line L31 is provided with a fuse h31 and a switching element s31 connected in series. The switching element s31 is, for example, a field-effect transistor. In the example shown in FIG. 4, the switching element s31 is implemented by an N-channel metal oxide semiconductor field-effect transistor (MOSFET).

The N-channel MOSFET includes a forward body diode Di oriented from a source S to a drain D. The switching element s31 has the drain D connected to the fuse h31 and the source S connected to the first braking unit 60. Alternatively, the switching element s31 may be implemented by a P-channel MOSFET.

The main power supply 201 may supply electric power to the first braking unit 60. The switching element s31 may switch a state of power supply from the main power supply 201 to the first braking unit 60 by an opening and closing operation. The power supply line L31 is an example of a "first main power supply line" in the present disclosure. The switching element s31 is an example of a "first switching element" in the present disclosure.

The main power supply 201 is connected to the first braking unit 60 via a power supply line L32. The power supply line L32 is provided with a fuse h32 and a switching element s32 connected in series. Similarly to the switching element s31, the switching element s32 is implemented by a field-effect transistor (N-channel MOSFET).

The switching element s32 has a drain D connected to the fuse h32 and a source S connected to the first braking unit 60. The switching element s32 may switch the state of power supply from the main power supply 201 to the first braking unit 60 by an opening and closing operation. The power supply line L32 is an example of a "second main power supply line" in the present disclosure. The switching element s32 is an example of a "second switching element" in the present disclosure.

In the example shown in FIG. 4, the power supply line L31 and the power supply line L32 are connected to the same first braking unit (electrical equipment), but the configuration is not limited thereto. For example, electrical equipment to which the power supply line L31 is connected and electrical equipment to which the power supply line L32 is connected may be different. The first braking unit 60 may include a plurality of pieces of electrical equipment, and the power supply line L31 and the power supply line L32 may be connected to different pieces of electrical equipment among the plurality of pieces of electrical equipment.

The main power supply 201 is connected to the second braking unit 70 via a power supply line L5. The power supply line L5 is provided with a fuse h5. The main power supply 201 may supply electric power to the second braking unit 70.

The auxiliary power supply 202 is connected to the power supply line L31 via a power supply line L2*b* and a power supply line L41. The auxiliary power supply 202 is connected to the power supply line L31 connected to the first braking unit 60. The power supply line L2*b* is provided with a switching element s2. The power supply line L41 is provided with a switching element s41.

The switching element s2 and the switching element s41 are connected in series. Similarly to the switching element s31, the switching element s2 and the switching element s41 are each implemented by a field-effect transistor (N-channel MOSFET). A drain D of the switching element s2 is connected to the auxiliary power supply 202, and a source S thereof is connected to a source S of the switching element s41.

A drain D of the switching element s41 is connected to the source S of the switching element s31, that is, the power supply line L31 connected to the first braking unit 60. The auxiliary power supply 202 may supply electric power to the first braking unit 60 via the switching element s2 and the switching element s41. The power supply line L41 is an example of a "first auxiliary power supply line" in the present disclosure. The switching element s41 is an example of a "third switching element" in the present disclosure.

The auxiliary power supply 202 is connected to the power supply line L32 via the power supply line L2*b* and a power supply line L42. The auxiliary power supply 202 is connected to the power supply line L32 connected to the first braking unit 60. The power supply line L2*b* is provided with the switching element s2 as described above.

The power supply line L42 is provided with a switching element s42. The switching element s2 and the switching element s42 are connected in series. Similarly to the switching element s31, the switching element s42 is implemented by a field-effect transistor (N-channel MOSFET). The drain D of the switching element s2 is connected to the auxiliary power supply 202, and the source S thereof is connected to a source S of the switching element s42.

A drain D of the switching element s42 is connected to the source S of the switching element s32, that is, the power supply line L32 connected to the first braking unit 60. The auxiliary power supply 202 may supply electric power to the first braking unit 60 via the switching element s2 and the switching element s42. The power supply line L42 is an example of a "second auxiliary power supply line" in the present disclosure. The switching element s42 is an example of a "fourth switching element" in the present disclosure.

The DC/DC converter 203 is connected to the power supply control unit 56 via a power supply line L4. The power supply line L4 is provided with a fuse h1. The DC/DC converter 203 may supply electric power to the power supply control unit 56. The DC/DC converter 203 may supply electric power to electrical equipment such as headlights and other control units (not shown).

The power supply control unit 56 is connected to the switching element s1 on the power supply line L2*a* by a signal line l1. The power supply control unit 56 is connected to the switching element s2 on the power supply line L2*b* by a signal line l2. The power supply control unit 56 is connected to the switching element s31 on the power supply line L31 by a signal line l31.

The power supply control unit 56 is connected to the switching element s32 on the power supply line L32 by a signal line l32. The power supply control unit 56 is connected to the switching element s41 on the power supply line L41 by a signal line l41. The power supply control unit 56 is connected to the switching element s42 on the power supply line L42 by a signal line l42.

The power supply control unit 56 is connected to gates G of the switching element s1, the switching element s2, the switching element s31, the switching element s32, the switching element s41, and the switching element s42, each of which is a MOSFET. The power supply control unit 56 has a function as a switching control unit that switches the switching element s1, the switching element s2, the switching element s31, the switching element s32, the switching element s41, and the switching element s42 between the opening states and closing states.

The power supply control unit 56 has functions as electrical equipment such as an integrated control module (ICM), an APS, a parking sensor system (PKS), an ABS, and an EPS.

The first braking unit 60 is provided in the braking force control system 28 in FIG. 3, for example. The first braking unit 60 includes a VSA, an EPB, and the like. The second braking unit 70 is provided in the braking force control system 28 in FIG. 3. The second braking unit 70 includes, for example, an electric servo brake (ESB).

[Operation of Power Supply Device 200 When Ignition Is ON]

Figure 5:
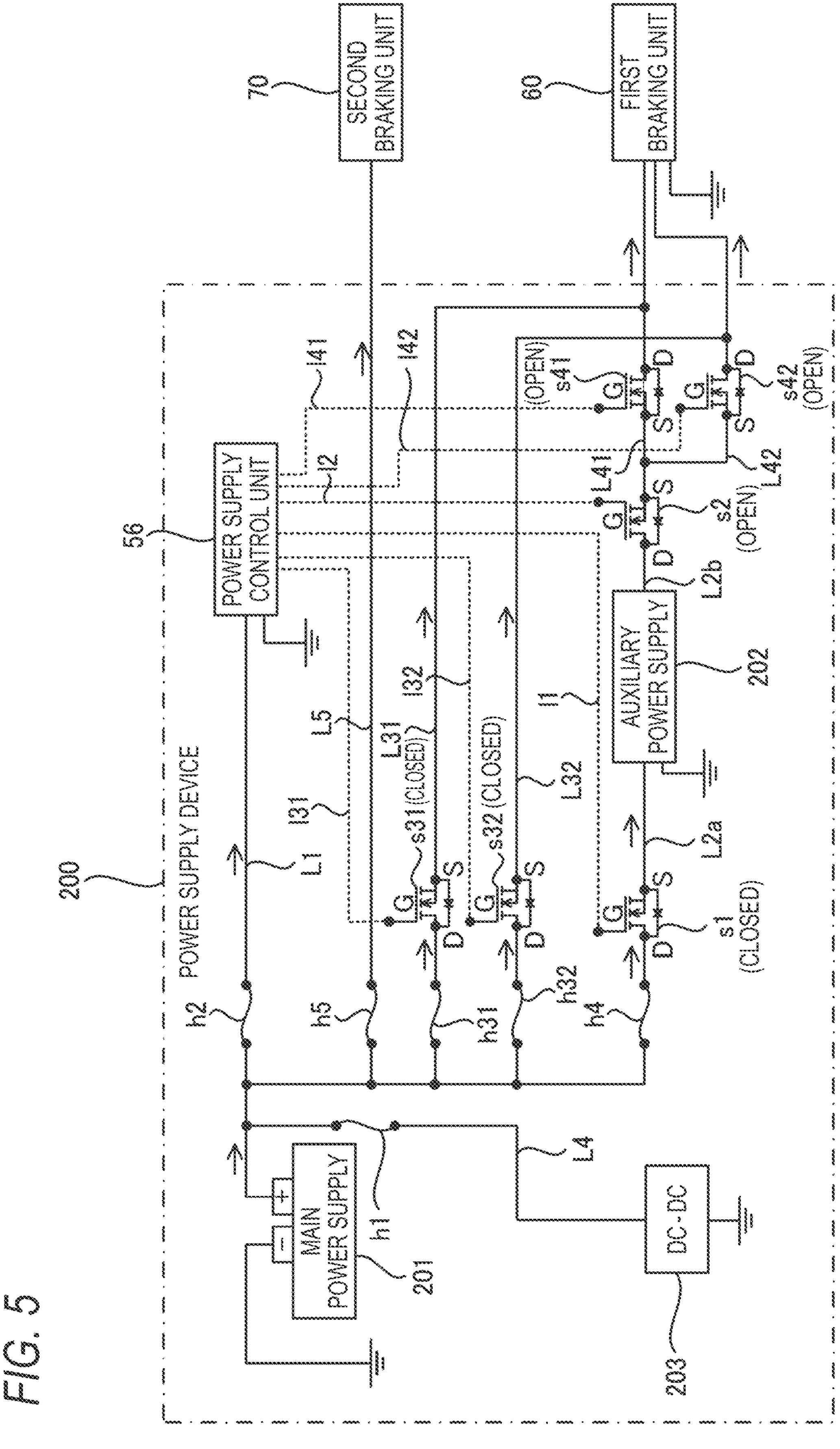

FIG. 5 shows an operation of the power supply device 200 when ignition is on. When ignition is on, the power supply control unit 56 of the power supply device 200 performs control such that the switching element s31 on the power supply line L31 is in a closed state and the switching element s32 on the power supply line L32 is in a closed state as shown in FIG. 5.

The power supply control unit 56 performs control such that the switching element sl on the power supply line L2*a* is in a closed state, the switching element s2 on the power supply line L2*b* is in an open state, the switching element s41 on the power supply line L41 is in an open state, and the switching element s42 on the power supply line L42 is in an open state.

Accordingly, in the power supply device 200, electric power is supplied from the main power supply 201 to the power supply control unit 56, the first braking unit 60, and the second braking unit 70. In addition, electric power is supplied (charged) from the main power supply 201 to the auxiliary power supply 202. An arrow in the drawing indicates a direction in which a current flows. In this example, the operation when ignition is on is described, and the power supply control unit 56 controls the switching element in the same manner also during a normal operation of the power supply device 200.

[Operation of Power Supply Device 200 When Charging of Auxiliary Power Supply 202 Is Completed]

Figure 6:
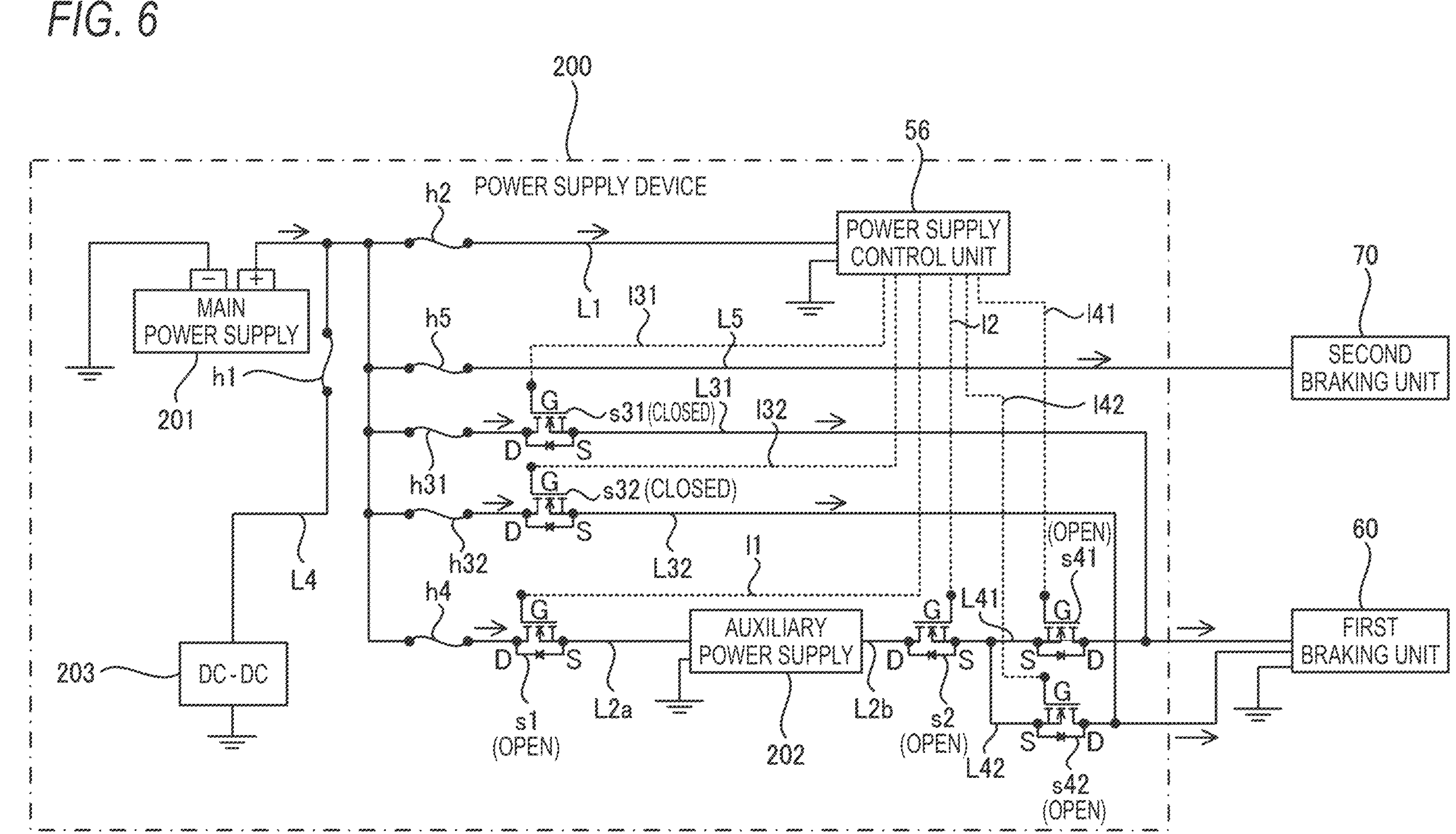
FIG. 6 shows an operation of the power supply device when charging of an auxiliary power supply is completed.

FIG. 6 shows an operation of the power supply device 200 when charging of the auxiliary power supply 202 is completed. As described above with reference to FIG. 5, when ignition is on, electric power is charged from the main power supply 201 to the auxiliary power supply 202. After ignition is turned on, when a predetermined time (for example, 20 sec) elapses and the charging of the auxiliary power supply 202 is completed, the power supply control unit 56 performs control to switch the switching element s1 on the power supply line L2*a* from a closed state to an open state. Accordingly, the charging from the main power supply 201 to the auxiliary power supply 202 is completed.

[Operation of Power Supply Device 200 When Main Power Supply 201 Fails]

Figure 7:
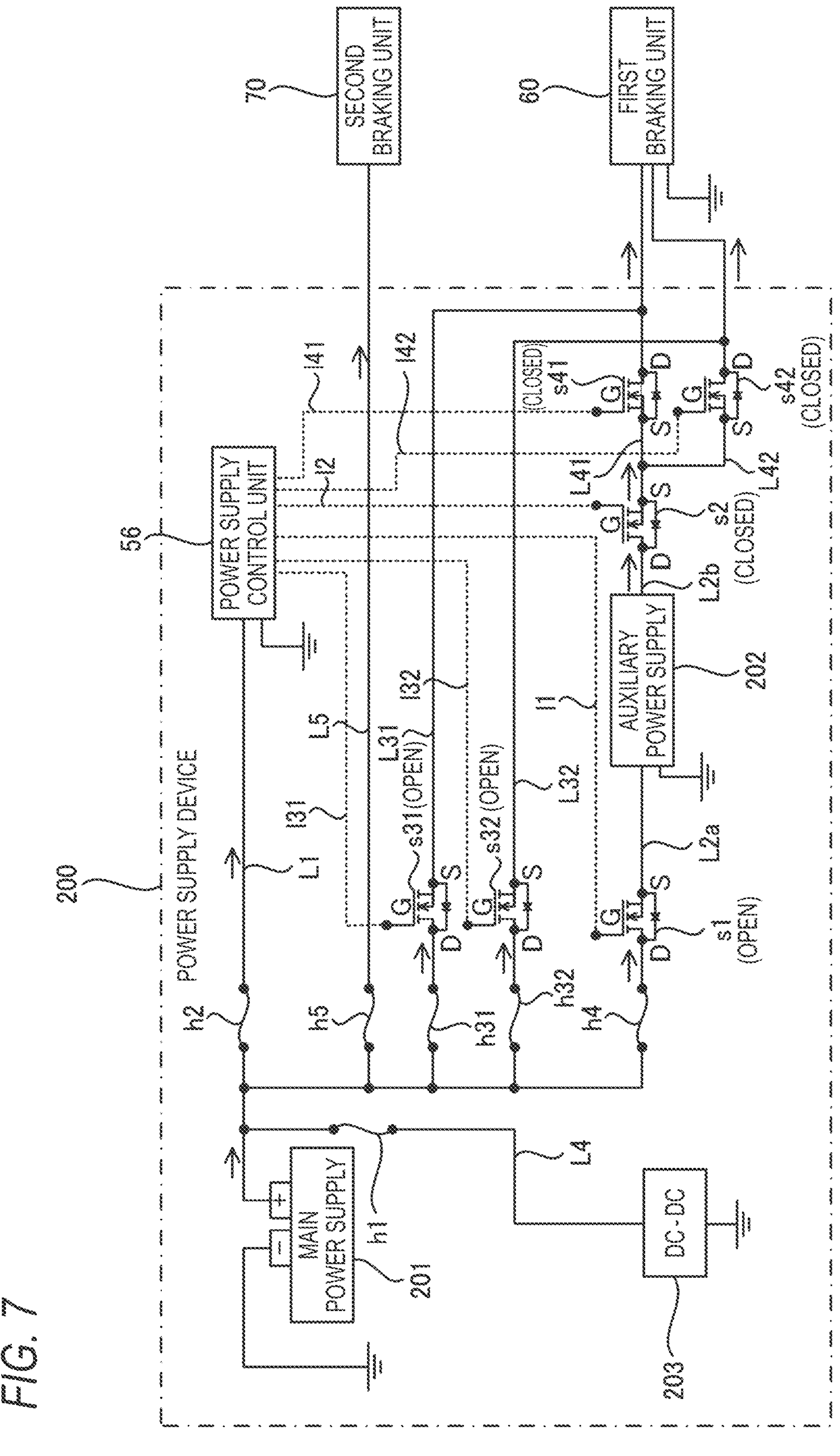
FIG. 7 shows an operation of the power supply device when a failure related to a main power supply is detected.

FIG. 7 shows an operation of the power supply device 200 when a failure related to the main power supply 201 is detected. The power supply control unit 56 measures a voltage value (for example, +12 V) at an output terminal of the main power supply 201 during an operation of the power supply device 200. The power supply control unit 56 determines whether the voltage value at the output terminal drops to less than 9.5 V, for example. The power supply control unit 56 determines that the main power supply 201 fails (voltage drop) when it is detected that a period during which the voltage value at the output terminal drops to less than 9.5 V continues for 200 μsec or longer, for example.

When the failure (voltage drop) related to the main power supply 201 is detected, the power supply control unit 56 determines that the power supply device 200 is in a failed state and performs an operation in response to the failure of the main power supply. The voltage drop in the main power supply 201 occurs, for example, when a load on the DC/DC converter 203 increases. When the load on the DC/DC converter 203 increases, overcurrent protection is activated (fuse h1 blows) and supply of electric power from the DC/DC converter 203 is cut off. In this case, electric power supplied from the DC/DC converter 203 is added as a load on the main power supply 201 and is demanded from the main power supply 201, and thus the voltage drop occurs in the main power supply 201.

When the main power supply fails, the power supply control unit 56 performs control such that the switching element s31 on the power supply line L31 is in an open state and the switching element s32 on the power supply line L32 is in an open state as shown in FIG. 7. The power supply control unit 56 performs control such that the switching element s1 on the power supply line L2*a* is in an open state, the switching element s2 on the power supply line L2*b* is in a closed state, the switching element s41 on the power supply line L41 is in a closed state, and the switching element s42 on the power supply line L42 is in a closed state.

In the power supply device 200, when the switching element s31 and the switching element s32 are each in an open state, supply of electric power from the main power supply 201 to the first braking unit 60 is cut off. By cutting off the supply of electric power from the main power supply 201 to the first braking unit 60, the load on the main power supply 201 is reduced, and thus the voltage drop in the main power supply 201 is prevented.

In the power supply device 200, when the switching element s1 is in an open state, supply (charging) of electric power from the main power supply 201 to the auxiliary power supply 202 is cut off. By cutting off the supply (charging) of electric power from the main power supply 201 to the auxiliary power supply 202, the load on the main power supply 201 is reduced, and thus the voltage drop in the main power supply 201 is prevented. Accordingly, a state in which electric power is able to be supplied from the main power supply 201 to the power supply control unit 56 is maintained.

In the power supply device 200, when the switching element s2, the switching element s41, and the switching element s42 are each in a closed state, electric power is supplied from the auxiliary power supply 202 to the first braking unit 60.

[Failure Detection Operation by Power Supply Device 200]

Figure 8:
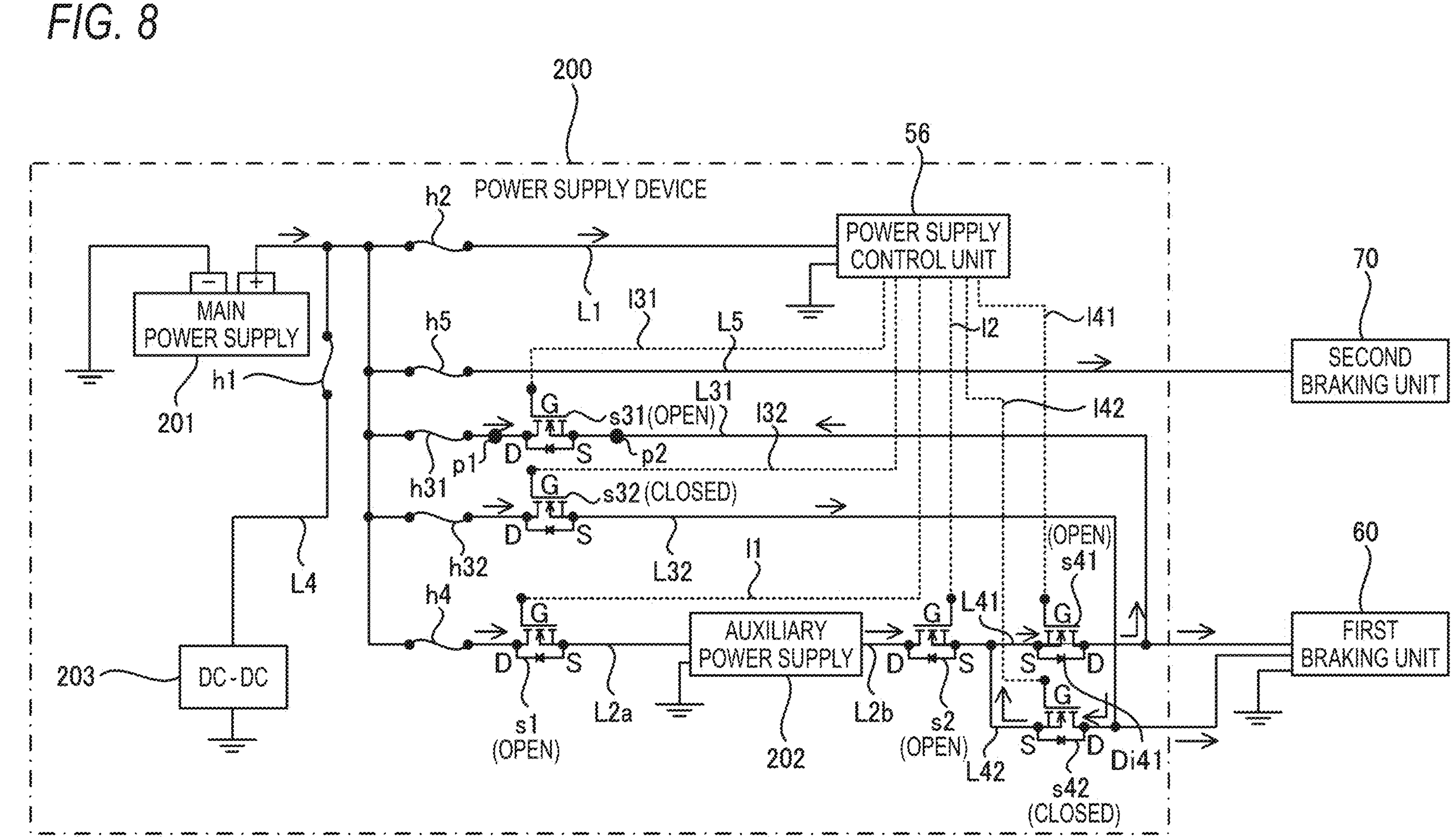
FIG. 8 shows an operation of the power supply device when detecting a failure of a switching element (part 1)

FIG. 8 shows an operation of the power supply device 200 when detecting a failure of the switching element s31.

When detecting whether the switching element s31 on the power supply line L31 fails, the power supply device 200 performs control by the power supply control unit 56 such that the switching element s31 on the power supply line L31 is in an open state and the switching element s32 on the power supply line L32 is in a closed state. The power supply device 200 performs control by the power supply control unit 56 such that the switching element sl on the power supply line L2*a* is in an open state, the switching element s2 on the power supply line L2*b* is in an open state, the switching element s41 on the power supply line L41 is in an open state, and the switching element s42 on the power supply line L42 is in a closed state. The failure of the switching element s31 may be, for example, switch sticking. Specifically, it may be a short circuit between the drain and the source of the switching element s31 implemented by the MOSFET.

The power supply device 200 detects the failure of the switching element s31 by comparing an output value at a measurement point p1 upstream (on the drain D side) of the switching element s31 with an output value at a measurement point p2 downstream (on the source S side) in a state in which each switching element is controlled by the power supply control unit 56 as shown in FIG. 8. The output values at the measurement points p1 and p2 are, for example, voltage values. However, the output values are not limited to voltage values, and may be, for example, current values or impedance values. The power supply control unit 56 is an example of a "failure detection unit" of the present disclosure.

First, for example, it is assumed that the switching element s31 does not fail. In this case, since the switching element s31 in this example is controlled to be in an open state, the voltage value at the measurement point p1 upstream of the switching element s31 is +12 V, which is the same potential as a voltage value at the main power supply 201. Since the switching element s31 is controlled to be in an open state, the measurement point p2 downstream of the switching element s31 is opened with respect to the measurement point p1.

Since the switching element s32 is controlled to be in a closed state in this example, electric power of the main power supply 201 is supplied to the first braking unit 60 via the switching element s32 and the power supply line L32. Since the switching element s42 in this example is controlled to be in a closed state and the switching element s41 is controlled to be in an open state, the electric power of the main power supply 201 via the switching element s32 and the power supply line L32 is supplied to the first braking unit 60 via the switching element s42 and the power supply line L42, the power supply line L41, and a forward body diode Di41 oriented from the source S to the drain D of the switching element s41.

Further, as described in FIG. 4, the drain D of the switching element s41 is connected to the source S of the switching element s31. Therefore, the voltage value at the measurement point p2 in the state of being opened from the measurement point p1 of the switching element s31, that is, a voltage value at the source S of the switching element s31 is the same potential as a voltage value at the drain D of the switching element s41. The voltage value at the drain D of the switching element s41 is a voltage value that drops by a forward voltage (for example, 0.2 V) of the body diode Di41 from the voltage value (+12V) of the main power supply 201 supplied to the first braking unit 60 via the switching element s32 and the power supply line L32. Thus, the voltage value at the measurement point p2 of the switching element s31 is lower than the voltage value at the main power supply 201.

Next, for example, it is assumed that the switching element s31 fails (switch sticking). In this case, although the switching element s31 is controlled to be in an open state, since there is switch sticking, the measurement point p1 upstream of the switching element s31 and the measurement point p2 downstream of the switching element s31 are in a short-circuited state, and the voltage values at the measurement point p1 and the measurement point p2 are each +12 V, which is the same potential as the voltage value at the main power supply 201.

In the state in which each switching element is controlled as shown in FIG. 8, the power supply device 200 determines that there is no failure of the switching element s31 when there is a predetermined difference between the output value at the measurement point p1 upstream and the output value at the measurement point p2 downstream of the switching element s31, and determines that there is a failure of the switching element s31 when there is no predetermined difference.

Figure 9:
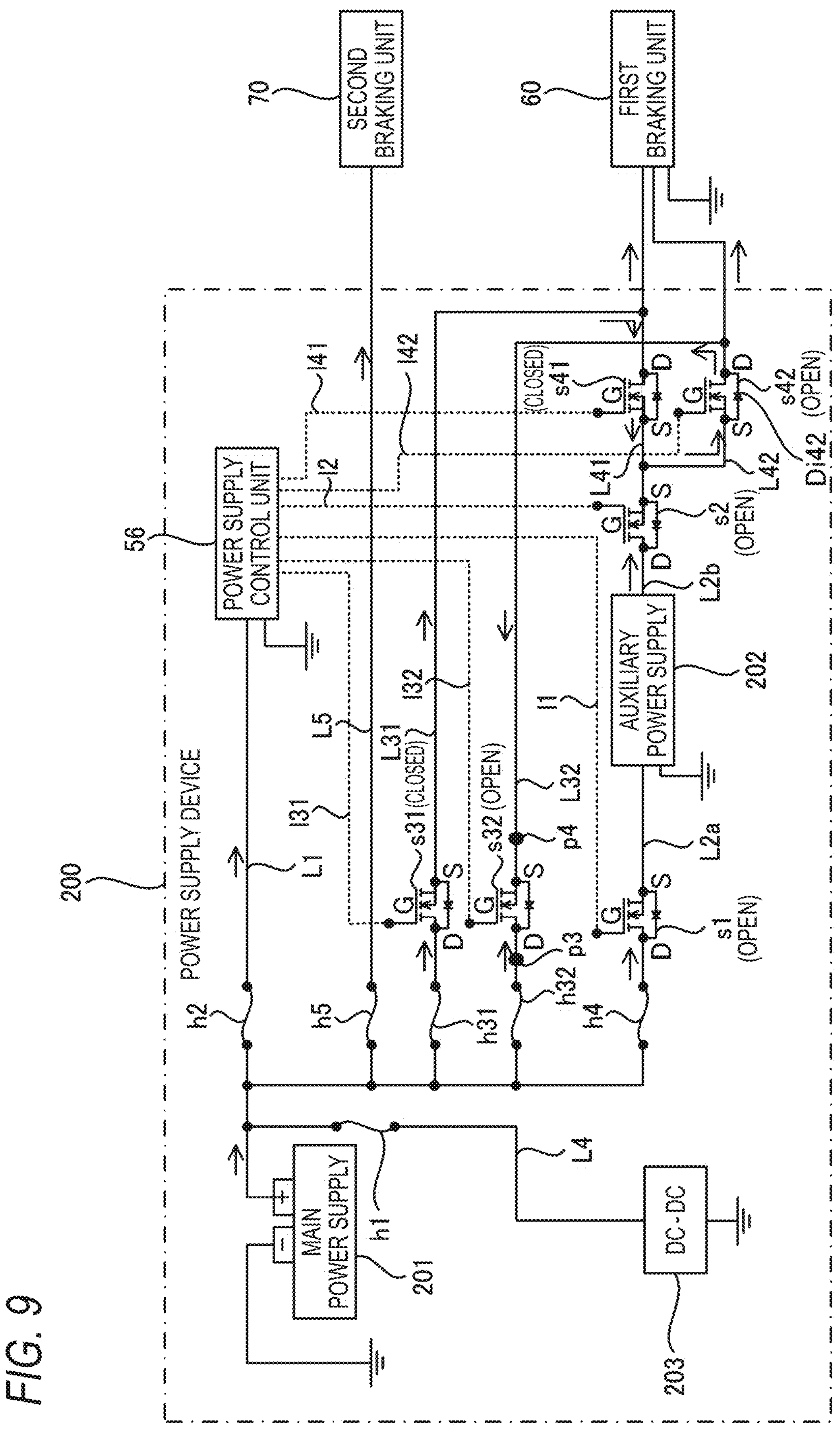
FIG. 9 shows an operation of the power supply device when detecting a failure of a switching element (part 2)

FIG. 9 shows an operation of the power supply device 200 when detecting a failure of the switching element s32.

When detecting whether the switching element s32 on the power supply line L32 fails, the power supply device 200 performs control by the power supply control unit 56 such that the switching element s31 on the power supply line L31 is in a closed state and the switching element s32 on the power supply line L32 is in an open state. The power supply device 200 performs control by the power supply control unit 56 such that the switching element sl on the power supply line L2*a* is in an open state, the switching element s2 on the power supply line L2*b* is in an open state, the switching element s41 on the power supply line L41 is in a closed state, and the switching element s42 on the power supply line L42 is in an open state.

The power supply device 200 detects the failure of the switching element s32 by comparing an output value at a measurement point p3 upstream (on the drain D side) of the switching element s32 with an output value at a measurement point p4 downstream (on the source S side) of the switching element s32 in a state in which each switching element is controlled as shown in FIG. 9.

First, for example, it is assumed that the switching element s32 does not fail. In this case, since the switching element s32 in this example is controlled to be in an open state, the voltage value at the measurement point p3 upstream of the switching element s32 is +12 V, which is the same potential as the voltage value at the main power supply 201. Since the switching element s32 is controlled to be in an open state, the measurement point p4 downstream of the switching element s32 is opened with respect to the measurement point p3.

Since the switching element s31 is controlled to be in a closed state in this example, electric power of the main power supply 201 is supplied to the first braking unit 60 via the switching element s31 and the power supply line L31. Since the switching element s41 in this example is controlled to be in a closed state and the switching element s42 is controlled to be in an open state, the electric power of the main power supply 201 via the switching element s31 and the power supply line L31 is supplied to the first braking unit 60 via the switching element s41 and the power supply line L41, the power supply line L42, and a forward body diode Di42 oriented from the source S to the drain D of the switching element s42.

Further, as described in FIG. 4, the drain D of the switching element s42 is connected to the source S of the switching element s32. Therefore, the voltage value at the measurement point p4 in the state of being opened from the measurement point p3 of the switching element s32, that is, a voltage value at the source S of the switching element s32 is the same potential as a voltage value at the drain D of the switching element s42. The voltage value at the drain D of the switching element s42 is a voltage value that drops by a forward voltage (for example, 0.2 V) of the body diode Di42 from the voltage value (+12V) of the main power supply 201 supplied to the first braking unit 60 via the switching element s31 and the power supply line L31. Thus, the voltage value at the measurement point p4 of the switching element s32 is lower than the voltage value at the main power supply 201.

Next, for example, it is assumed that the switching element s32 fails (switch sticking). In this case, although the switching element s32 is controlled to be in an open state, since there is switch sticking, the measurement point p3 upstream of the switching element s32 and the measurement point p4 downstream of the switching element s32 are in a short-circuited state, and the voltage values at the measurement point p3 and the measurement point p4 are each +12V, which is the same potential as the voltage value at the main power supply 201.

In the state in which each switching element is controlled as shown in FIG. 9, the power supply device 200 determines that there is no failure of the switching element s32 when there is a predetermined difference between the output value at the measurement point p3 upstream of the switching element s32 and the output value at the measurement point p4 downstream of the switching element s32, and determines that there is a failure of the switching element s32 when there is no predetermined difference.

Control Example of Power Supply Control Unit 56

Figure 10:
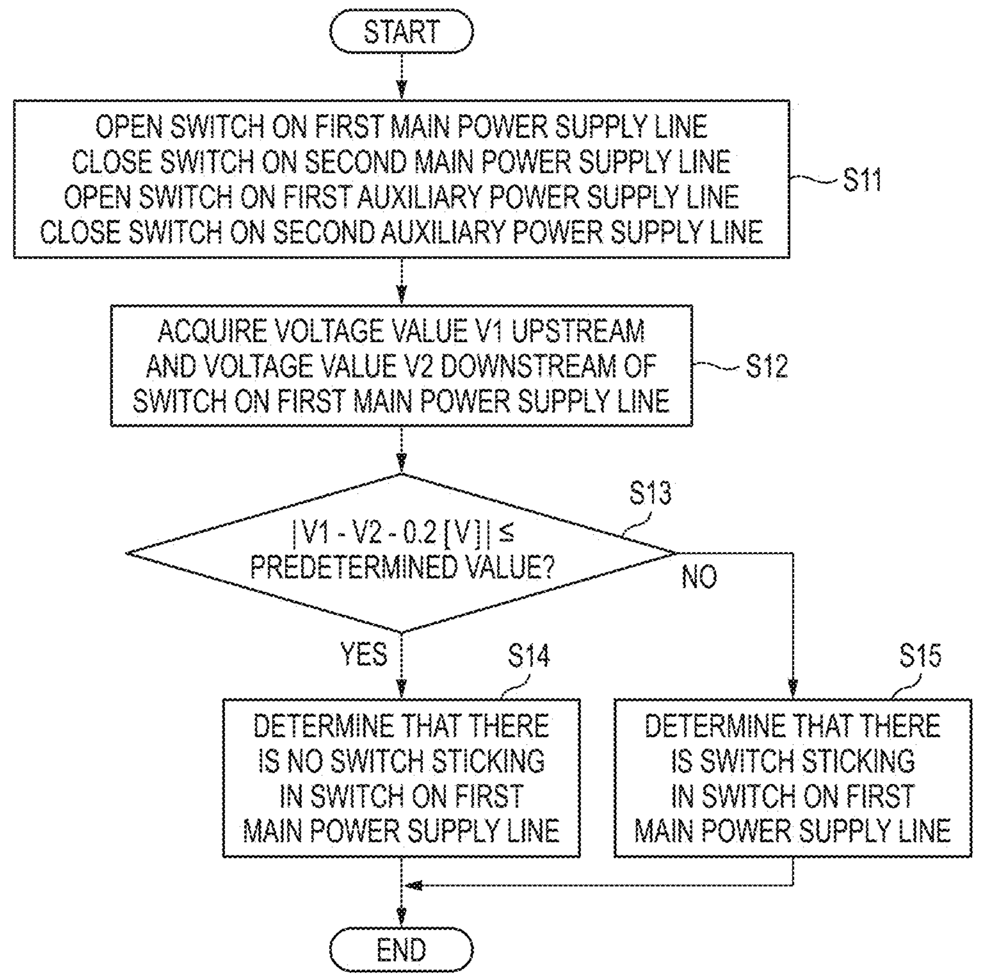
FIG. 10 is a flowchart (part 1) showing one example of failure determination processing of the switching element by a power supply control unit.

Next, a control example of the power supply control unit 56 in the power supply device 200 will be described. FIG. 10 is a flowchart showing one example of failure determination processing of the switching element s31 by the power supply control unit 56. When no failure related to the main power supply 201 is detected, for example, the power supply control unit 56 repeatedly executes the present failure determination processing at a normal time after charging to the auxiliary power supply 202 described in FIG. 6 ends.

First, in the power supply device 200, the power supply control unit 56 sets the switching element s31 on the power supply line L31 (first main power supply line) to an open state, the switching element s32 on the power supply line L32 (second main power supply line) to a closed state, the switching element s41 on the power supply line L41 (first auxiliary power supply line) to an open state, and the switching element s42 on the power supply line L42 (second auxiliary power supply line) to a closed state (step S11: see FIG. 8).

Next, the power supply control unit 56 acquires a voltage value V1 at the measurement point p1 upstream of the switching element s31 on the power supply line L31 and a voltage value V2 at the measurement point p2 downstream of the switching element s31 (step S12).

Next, the power supply control unit 56 determines whether an absolute value obtained by subtracting the voltage value V2 and 0.2 V from the voltage value V1 acquired in step S12 is equal to or less than a predetermined value (step S13). Here, 0.2 V is a value corresponding to a forward voltage drop of the body diode Di41. The predetermined value is a value slightly larger than 0 (tolerance: for example, 0.1 V). That is, it is determined whether V1-V2 is about 0.2 V (whether there is a predetermined difference between V1 and V2).

In step S13, when the absolute value is equal to or less than the predetermined value, that is, when there is a predetermined difference between the voltage value V1 and the voltage value V2 (step S13: Yes), the power supply control unit 56 determines that there is no switch sticking (failure) in the switching element s31 on the power supply line L31 (step S14).

In step S13, when the absolute value is not equal to or less than the predetermined value, that is, when there is no predetermined difference between the voltage value V1 and the voltage value V2 (step S13: No), the power supply control unit 56 determines that there is switch sticking (failure) in the switching element s31 on the power supply line L31 (step S15).

Figure 11:
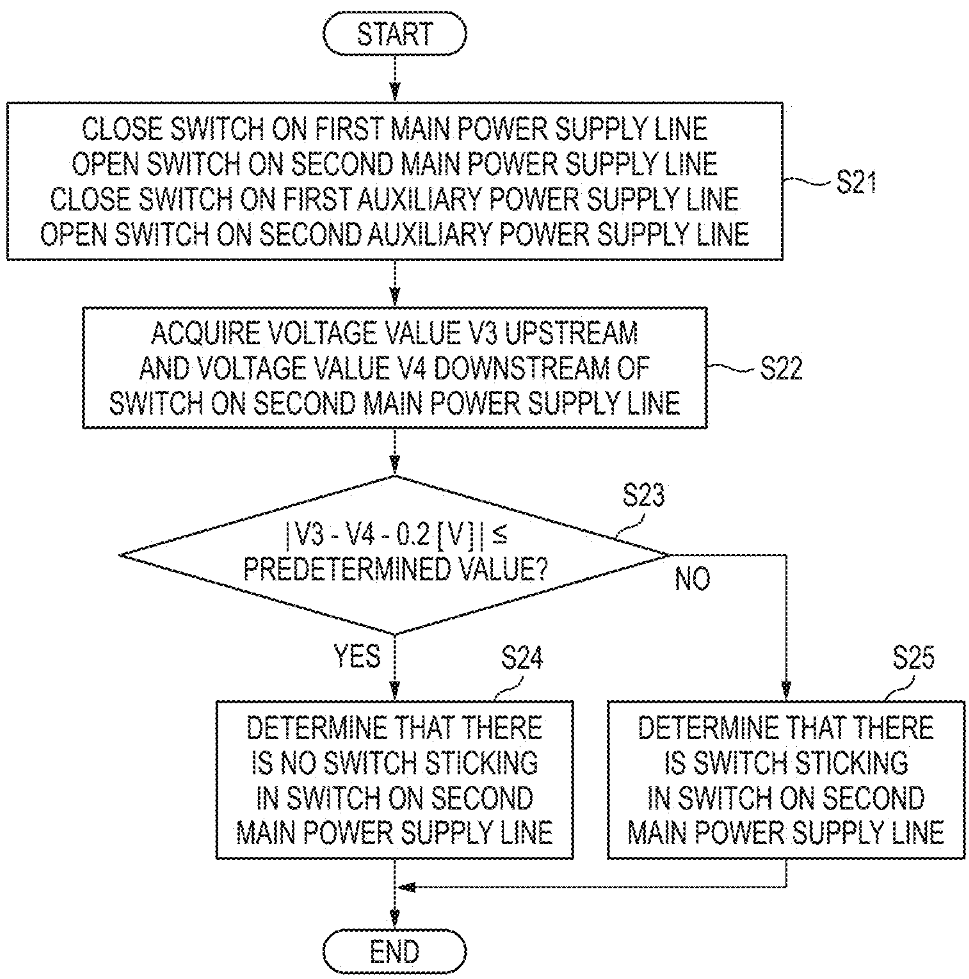
FIG. 11 is a flowchart (part 2) showing an example of the failure determination processing of the switching element by the power supply control unit.

FIG. 11 is a flowchart showing one example of failure determination processing of the switching element s32 by the power supply control unit 56. Similarly to the failure determination processing of the switching element s31 shown in FIG. 10, the power supply control unit 56 repeatedly executes the present failure determination processing at the normal state.

First, in the power supply device 200, the power supply control unit 56 sets the switching element s31 on the power supply line L31 (first main power supply line) to a closed state, the switching element s32 on the power supply line L32 (second main power supply line) to an open state, the switching element s41 on the power supply line L41 (first auxiliary power supply line) to a closed state, and the switching element s42 on the power supply line L42 (second auxiliary power supply line) to an open state (step S21: see FIG. 9).

Next, the power supply control unit 56 acquires a voltage value V3 at the measurement point p3 upstream of the switching element s32 on the power supply line L32 and a voltage value V4 at the measurement point p4 downstream of the switching element s32 (step S22).

Next, the power supply control unit 56 determines whether an absolute value obtained by subtracting the voltage value V4 and 0.2 V from the voltage value V3 acquired in step S22 is equal to or less than a predetermined value (step S23). Here, 0.2 V is a value corresponding to a forward voltage drop of the body diode Di42. The predetermined value is a value slightly larger than 0 (tolerance: for example, 0.1 V). That is, it is determined whether V3-V4 is about 0.2 V (whether there is a predetermined difference between V3 and V4).

In step S23, when the absolute value is equal to or less than the predetermined value, that is, when there is a predetermined difference between the voltage value V3 and the voltage value V4 (step S23: Yes), the power supply control unit 56 determines that there is no switch sticking (failure) in the switching element s32 on the power supply line L32 (step S24).

In step S23, when the absolute value is not equal to or less than the predetermined value, that is, when there is no predetermined difference between the voltage value V3 and the voltage value V4 (step S23: No), the power supply control unit 56 determines that there is switch sticking (failure) in the switching element s32 on the power supply line L32 (step S25).

As described above, the power supply device 200 according to the present disclosure includes the power supply line L31 that connects the main power supply 201 to the first braking unit 60, and the power supply line L32 that is different from the power supply line L31 and connects the main power supply 201 to the first braking unit 60. The switching elements s31, s32, s41, and s42 provided on these power supply lines may be switched to supply electric power of the main power supply 201 to the first braking unit 60 via only one of the power supply lines.

Therefore, when determining failures of the switching element s31 provided on the power supply line L31 and the switching element s32 provided on the power supply line L32, failure determination of the switching element s31 and the switching element s32 may be performed while supplying electric power to the first braking unit 60 by switching the open and closed states of the switching elements s31, s32, s41, and s42. Therefore, in the failure determination of the switching elements, it is possible to prevent a situation in which the first braking unit 60 enters a battery cancellation and warning state due to cut-off of supply of electric power to the first braking unit 60.

The power supply device 200 uses field-effect transistors as the switching elements s31, s32, s41, and s42, and thus may perform the defect determination of the switching elements s31 and s32 based on the forward voltage drop of the body diode between the source and the drain while supplying electric power to the first braking unit 60.

The control method described in the above embodiment may be implemented by executing a control program prepared in advance on a computer. The control program is stored in a computer-readable storage medium and executed by being read from the storage medium. In addition, the control program may be provided in a form stored in a non-transitory storage medium such as a flash memory, or may be provided via a network such as the Internet. The computer that executes the control program may be provided in the power supply device, may be provided in an electronic device such as a smartphone, a tablet terminal, or a personal computer that can communicate with the power supply device, or may be provided in a server device that can communicate with the power supply device and the electronic device.

Although the embodiment of the present disclosure has been described above, the present disclosure is not limited to the above-described embodiment, and modifications, improvements, and the like can be appropriately made.

For example, in the above embodiment, a case has been described in which the vehicle 10 automatically moves to a parking space (target parking position), but the present disclosure is not limited thereto. For example, the power supply device according to the present disclosure may be employed in a case where the vehicle 10 moves automatically on a road or the like.

In the present specification, at least the following matters are described. Although corresponding constituent elements or the like in the embodiment described above are shown in parentheses, the present disclosure is not limited thereto.

(1) A power supply device including:

a main power supply (main power supply 201) configured to supply electric power to electrical equipment (first braking unit 60, second braking unit 70);

an auxiliary power supply (auxiliary power supply 202) different from the main power supply, the auxiliary power supply being configured to supply electric power to the electrical equipment (first braking unit 60);

a first main power supply line (power supply line L31) configured to connect the main power supply to the electrical equipment;

a second main power supply line (power supply line L32) different from the first main power supply line, the second main power supply line being configured to connect the main power supply to the electrical equipment;

a first auxiliary power supply line (power supply line L41) configured to connect the auxiliary power supply to the first main power supply line;

a second auxiliary power supply line (power supply line L42) configured to connect the auxiliary power supply to the second main power supply line;

a first switching element (switching element s31) provided on the first main power supply line, the first switching element being configured to switch a state of power supply from the main power supply to the electrical equipment;

a second switching element (switching element s32) provided on the second main power supply line, the second switching element being configured to switch the state of power supply from the main power supply to the electrical equipment;

a third switching element (switching element s41) provided on the first auxiliary power supply line, the third switching element being configured to switch a state of power supply from the auxiliary power supply to the electrical equipment;

a fourth switching element (switching element s42) provided on the second auxiliary power supply line, the fourth switching element being configured to switch the state of power supply from the auxiliary power supply to the electrical equipment; and a failure detection unit (power supply control unit 56) configured to detect a failure of the first switching element or the second switching element, in which the failure detection unit detects the failure of the first switching element by comparing an output value on an upstream side with an output value on a downstream side of the first switching element in a state in which the first switching element and the third switching element are opened whereas the second switching element and the fourth switching element are closed.

According to (1), it is possible to perform failure determination of the switching element while supplying electric power to the electrical equipment by switching opening and closing of the switching element at the time of the failure determination, and it is possible to prevent the electrical equipment from being brought into a battery cancellation and warning state due to cut-off of supply of electric power to the electrical equipment.

(2) The power supply device according to (1), in which the failure detection unit detects the failure of the second switching element by comparing an output value on an upstream side with an output value on a downstream side of the second switching element in a state in which the second switching element and the fourth switching element are opened whereas the first switching element and the third switching element are closed.

According to (2), it is possible to perform failure determination of the switching element while supplying electric power to the electrical equipment by switching opening and closing of the switching element at the time of the failure determination, and it is possible to prevent the electrical equipment from being brought into a battery cancellation and warning state due to cut-off of supply of electric power to the electrical equipment.

(3) The power supply device according to (1) or (2), in which the failure detection unit determines that there is no failure when a predetermined difference occurs between the output value on the upstream side and the output value on the downstream side, and determines that there is a failure when the predetermined difference does not occur between the output value on the upstream side and the output value on the downstream side.

According to (3), it is possible to easily and accurately perform failure determination of the switching element based on presence or absence of the difference between the output values.

(4) The power supply device according to (3), in which the predetermined difference is a difference corresponding to a forward voltage of the third switching element or the fourth switching element.

According to (4), it is possible to easily and accurately perform failure determination of the switching element based on the forward voltage of the switching element.

(5) The power supply device according to any one of (1) to (4), in which each of the output values is at least one of a voltage value, a current value, and an impedance.

As in (5), as the output values for comparing the difference, voltage values, current values, and impedances are preferable.

(6) The power supply device according to any one of (1) to (5), in which the electrical equipment includes a braking unit (first braking unit 60) of a moving object (vehicle 10), and the power supply device further includes a power supply control unit (power supply control unit 56) configured to enable, when a failure related to the main power supply is detected, a state in which electric power is supplied from the auxiliary power supply to the braking unit, and a movement control unit (movement control unit 55) configured to perform movement control of the moving object and control the braking unit to stop the moving object when the failure related to the main power supply is detected.

As in (6), when the failure related to the main power supply is detected, it is preferable to supply electric power from the auxiliary power supply to the braking unit and control the braking unit to stop the moving object.

(7) The power supply device according to any one of (1) to (6), in which the failure detection unit performs a notification when the failure of the first switching element or the second switching element is detected.

As in (7), when the failure of the first switching element or the second switching element is detected, it is preferable to notify the user of the failure detection.

(8) The power supply device according to any one of (1) to (7), further including:

a power supply control unit configured to determine, when the failure of the first switching element or the second switching element is detected, whether the supply of electric power to the electrical equipment is stoppable, and to stop the supply of electric power to the electrical equipment when the supply of electric power to the electrical equipment is stoppable.

As in (8), it is preferable to determine whether the supply of electric power is stoppable for stopping the supply of electric power to the electrical equipment.

(9) The power supply device according to any one of (1) to (8), in which the first switching element, the second switching element, the third switching element, and the fourth switching element are field-effect transistors.

As in (9), the switching element that performs failure determination by comparing the output values is preferably a field-effect transistor including a body diode between a source and a drain.

(10) A control method for a power supply device, the power supply device including a main power supply configured to supply electric power to electrical equipment, an auxiliary power supply different from the main power supply, the auxiliary power supply being configured to supply electric power to the electrical equipment, a first main power supply line configured to connect the main power supply to the electrical equipment, a second main power supply line different from the first main power supply line, the second main power supply line being configured to connect the main power supply to the electrical equipment, a first auxiliary power supply line configured to connect the auxiliary power supply to the first main power supply line, a second auxiliary power supply line configured to connect the auxiliary power supply to the second main power supply line, a first switching element provided on the first main power supply line, the first switching element being configured to switch a state of power supply from the main power supply to the electrical equipment, a second switching element provided on the second main power supply line, the second switching element being configured to switch the state of power supply from the main power supply to the electrical equipment, a third switching element provided on the first auxiliary power supply line, the third switching element being configured to switch a state of power supply from the auxiliary power supply to the electrical equipment, and a fourth switching element provided on the second auxiliary power supply line, the fourth switching element being configured to switch the state of power supply from the auxiliary power supply to the electrical equipment, the control method including:

causing a processor of the power supply device to detect a failure of the first switching element by comparing an output value on an upstream side with an output value on a downstream side of the first switching element in a state in which the first switching element and the third switching element are opened whereas the second switching element and the fourth switching element are closed.

According to (10), it is possible to perform failure determination of the switching element while supplying electric power to the electrical equipment by switching opening and closing of the switching element at the time of the failure determination, and it is possible to prevent the electrical equipment from being brought into a battery cancellation and warning state due to cut-off of supply of electric power to the electrical equipment.

(11) A non-transitory computer readable storage medium storing a control program for a power supply device, the power supply device including a main power supply configured to supply electric power to electrical equipment, an auxiliary power supply different from the main power supply, the auxiliary power supply being configured to supply electric power to the electrical equipment, a first main power supply line configured to connect the main power supply to the electrical equipment, a second main power supply line different from the first main power supply line, the second main power supply line being configured to connect the main power supply to the electrical equipment, a first auxiliary power supply line configured to connect the auxiliary power supply to the first main power supply line, a second auxiliary power supply line configured to connect the auxiliary power supply to the second main power supply line, a first switching element provided on the first main power supply line, the first switching element being configured to switch a state of power supply from the main power supply to the electrical equipment, a second switching element provided on the second main power supply line, the second switching element being configured to switch the state of power supply from the main power supply to the electrical equipment, a third switching element provided on the first auxiliary power supply line, the third switching element being configured to switch a state of power supply from the auxiliary power supply to the electrical equipment, and a fourth switching element provided on the second auxiliary power supply line, the fourth switching element being configured to switch the state of power supply from the auxiliary power supply to the electrical equipment, the control program causing a processor of the power supply device to execute processing, the processing including:

detecting a failure of the first switching element by comparing an output value on an upstream side with an output value on a downstream side of the first switching element in a state in which the first switching element and the third switching element are opened whereas the second switching element and the fourth switching element are closed.

According to (11), it is possible to perform failure determination of the switching element while supplying electric power to the electrical equipment by switching opening and closing of the switching element at the time of the failure determination, and it is possible to prevent the electrical equipment from being brought into a battery cancellation and warning state due to cut-off of supply of electric power to the electrical equipment.

What is claimed is:

1. A power supply device comprising:

a main power supply configured to supply electric power to electrical equipment;

an auxiliary power supply different from the main power supply, the auxiliary power supply being configured to supply electric power to the electrical equipment;

a first main power supply line configured to connect the main power supply to the electrical equipment;

a second main power supply line different from the first main power supply line, the second main power supply line being configured to connect the main power supply to the electrical equipment;

a first auxiliary power supply line configured to connect the auxiliary power supply to the first main power supply line;

a second auxiliary power supply line configured to connect the auxiliary power supply to the second main power supply line;

a first switching element provided on the first main power supply line, the first switching element being configured to switch a state of power supply from the main power supply to the electrical equipment;

a second switching element provided on the second main power supply line, the second switching element being configured to switch the state of power supply from the main power supply to the electrical equipment;

a third switching element provided on the first auxiliary power supply line, the third switching element being configured to switch a state of power supply from the auxiliary power supply to the electrical equipment;

a fourth switching element provided on the second auxiliary power supply line, the fourth switching element being configured to switch the state of power supply from the auxiliary power supply to the electrical equipment; and a failure detection unit configured to detect a failure of the first switching element or the second switching element, wherein the failure detection unit detects the failure of the first switching element by comparing an output value on an upstream side with an output value on a downstream side of the first switching element in a state in which the first switching element and the third switching element are opened whereas the second switching element and the fourth switching element are closed, the electrical equipment includes a braking unit of a moving object, and the power supply device further comprises a power supply control unit configured to enable, when a failure related to the main power supply is detected, a state in which electric power is supplied from the auxiliary power supply to the braking unit, and a movement control unit configured to perform movement control of the moving object and control the braking unit to stop the moving object when the failure related to the main power supply is detected.

2. A power supply device comprising:

a main power supply configured to supply electric power to electrical equipment;

an auxiliary power supply different from the main power supply, the auxiliary power supply being configured to supply electric power to the electrical equipment;

a first main power supply line configured to connect the main power supply to the electrical equipment;

a second main power supply line different from the first main power supply line, the second main power supply line being configured to connect the main power supply to the electrical equipment;

a first auxiliary power supply line configured to connect the auxiliary power supply to the first main power supply line;

a second auxiliary power supply line configured to connect the auxiliary power supply to the second main power supply line;

a first switching element provided on the first main power supply line, the first switching element being configured to switch a state of power supply from the main power supply to the electrical equipment;

a second switching element provided on the second main power supply line, the second switching element being configured to switch the state of power supply from the main power supply to the electrical equipment;

a third switching element provided on the first auxiliary power supply line, the third switching element being configured to switch a state of power supply from the auxiliary power supply to the electrical equipment;

a fourth switching element provided on the second auxiliary power supply line, the fourth switching element being configured to switch the state of power supply from the auxiliary power supply to the electrical equipment;

a failure detection unit configured to detect a failure of the first switching element or the second switching element; and a power supply control unit configured to determine, when the failure of the first switching element or the second switching element is detected, whether the supply of electric power to the electrical equipment is stoppable, and to stop the supply of electric power to the electrical equipment when the supply of electric power to the electrical equipment is stoppable, wherein the failure detection unit detects the failure of the first switching element by comparing an output value on an upstream side with an output value on a downstream side of the first switching element in a state in which the first switching element and the third switching element are opened whereas the second switching element and the fourth switching element are closed.

* * * * *